No. 745,482. PATENTED DEC. 1, 1903.
J. A. CONNELLY.
SWIVEL PIPE JOINT.
APPLICATION FILED AUG. 29, 1903.
NO MODEL.
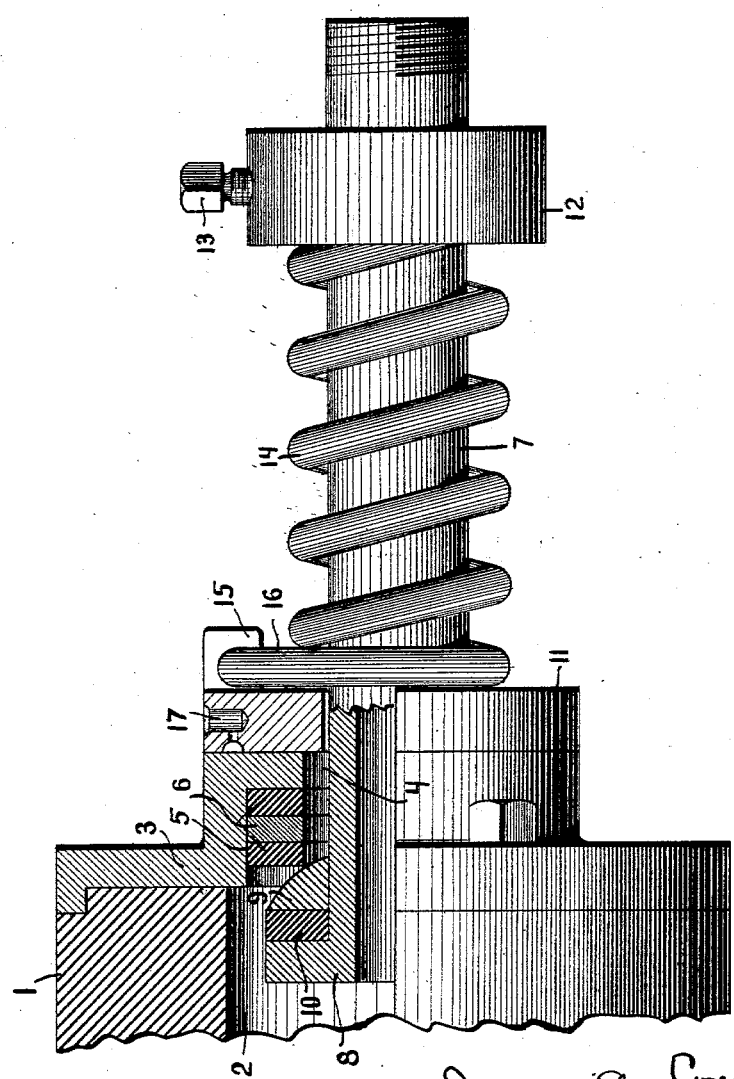
Witnesses:
Elmer R. Shipley
M. S. Belden.
James A. Connelly
Inventor
by James W. See
Attorney No. 745,482.

Patented December 1, 1903.

UNITED STATES PATENT OFFICE.

JAMES A. CONNELLY, OF HAMILTON, OHIO.

SWIVEL PIPE-JOINT.

SPECIFICATION forming part of Letters Patent No. 745,482, dated December 1, 1903.

Application filed August 29, 1903. Serial No. 171,176. (No model.)

*To all whom it may concern:*

Be it known that I, JAMES A. CONNELLY, a citizen of the United States, residing at Hamilton, Butler county, Ohio, (post-office address, care Black & Clawson Company, Hamilton, Ohio,) have invented certain new and useful Improvements in Swivel Pipe-Joints, of which the following is a specification.

This invention pertains to improvements in pipe-joints and will be found of special utility where steam-pipes are to connect with rotary cylinders—as, for instance, the driers used in paper-making machines.

The invention will be readily understood from the following description, taken in connection with the accompanying drawing, which is a side elevation, part longitudinal section, of my improved joint.

In the drawing, 1 indicates the rotary body with which the joint is to make connection—say, for instance, the neck of the rotary drier of the paper-making machine; 2, its bore; 3, a flange secured steam-tight against its face; 4, the central bore of the flange; 5, an inner counterbore for the bore of the flange; 6, a number of washers disposed in the counterbore, these washers being formed of vulcanized fiber, though the intermediate one may be of metal; 7, the stationary pipe, passing inwardly through the flange of the washers and free of contact with them; 8, a head on the inner end of this pipe of greater diameter than the bore of the washers; 9, a collar disposed upon the pipe outwardly beyond the head 8 and free to turn upon the pipe, the outer surface of this collar forming the frustum of a sphere and having engagement with the inner corner of the inner one of the washers in the counterbore; 10, a washer of vulcanized fiber disposed between head 8 and collar 9 and preferably arranged to turn freely upon the pipe; 11, a collar loosely surrounding the pipe and seating against the outer surface of the flange; 12, a collar adjustably secured upon the outer portion of the pipe at a distance from collar 11; 13, a set-screw securing collar 12 to the pipe and permitting of its adjustment; 14, a helical spring surrounding the pipe between collars 11 and 12 and abutting against them; 15, a lug projecting outwardly from collar 11; 16, an outwardly-turned portion of the inner convolution of the spring, its end abutting on lug 15; and 17, an oil-hole in collar 11 to deliver oil to the contacting faces of that collar and the flange.

The spring draws collar 9 into steam-tight contact with the inner one of washers 6, and collar 9 is to be of highly-polished metal. It runs in contact with the vulcanized fiber, and the steam-tight fit is extremely durable. Collar 9 may stand or turn according as the friction is the greater on its one side or the other, and if it turns it turns in contact with fiber washer 10, which in its turn may rotate against the head of the pipe. The structure is thus kept steam-tight and by means of an outside spring and the curved contour of collar 9 permits reasonable flexation of the joint. A single fiber collar will answer in the counterbore; but a number of collars, with or without interposed metal collars, are advisable. The tension of the spring may be adjusted by shifting the collar 12.

It is obvious that part 1 may turn while the pipe is stationary, or, if desired, part 1 may be stationary and the pipe turn. The direction of relative rotation should be such that the end 16 of the spring impinges against lug 15, thus compelling washer 11 to stand or turn with the spring, whereby the wearing of the ends of the spring is prevented.

I claim as my invention—

1. In a swivel-joint, the combination, substantially as set forth, of a flange provided with a counterbore upon its inner side, a washer of vulcanized fiber seated in said counterbore, a pipe projecting through the flange and beyond the counterbore, a head on the inner end of the pipe, a collar upon the pipe between the head and said washer and having a globular face engaging the inner corner of said washer, a collar upon the outer portion of the pipe and seating against the flange, a collar mounted adjustably farther outward upon the pipe, and a helical spring surrounding the pipe and compressed between the last-mentioned collars.

2. In a swivel-joint, the combination, substantially as set forth, of a flange provided with a counterbore upon its inner side, a washer of vulcanized fiber seated in said counterbore, a pipe projecting through the flange and beyond the counterbore, a head on the inner end of the pipe, a collar upon the pipe between the head and said washer and having a globular face engaging the inner corner of said washer, a vulcanized-fiber washer disposed between said last-mentioned collar and the head, a collar upon the outer portion of the pipe and seating against the flange, a collar mounted adjustably farther outward upon the pipe, and a helical spring surrounding the pipe and compressed between the last-mentioned collars.

3. In a swivel-joint, the combination, substantially as set forth, of a flange provided with a counterbore upon its inner side, a washer of vulcanized fiber seated in said counterbore, a pipe projecting through the flange and beyond the counterbore, a head on the inner end of the pipe, a collar upon the pipe between the head and said washer and having a globular face engaging the inner corner of said washer, a collar upon the outer portion of the pipe and seating against the flange, a lug projecting outwardly from said collar, a collar mounted adjustably farther outward upon the pipe, and a helical spring surrounding the pipe between said last-mentioned collars and compressed between them and having an outwardly-projecting end engaging said lug.

4. In a swivel-joint, the combination, substantially as set forth, of a flange, a pipe projecting loosely through said flange, a collar-surface at the inner end of the pipe presenting toward the flange and having a globular face, and a spring acting upon the pipe and flange at the outer face of the flange and urging said globular face toward the flange.

5. In a swivel-joint, the combination, substantially as set forth, of a flange, a pipe disposed loosely in the bore of the flange, a head on the inner end of the pipe, a collar loose on the pipe between said head and flange, a washer disposed between said head and collar, and a spring acting on the pipe and flange outside the flange and urging said collar toward the flange.

In testimony whereof I have signed this specification this 27th day of August, 1903.

JAMES A. CONNELLY.

Witnesses:
J. W. SEE,
NELSON WILLIAMS.